(12) United States Patent
Agarwal

(10) Patent No.: US 12,165,629 B2
(45) Date of Patent: Dec. 10, 2024

(54) SYSTEM AND METHOD FOR IMPROVING AIR TRAFFIC COMMUNICATION (ATC) TRANSCRIPTION ACCURACY BY INPUT OF PILOT RUN-TIME EDITS

(71) Applicant: HONEYWELL INTERNATIONAL INC., Charlotte, NC (US)

(72) Inventor: Jitender Kumar Agarwal, Bangalore (IN)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 252 days.

(21) Appl. No.: 17/658,332

(22) Filed: Apr. 7, 2022

(65) Prior Publication Data

US 2023/0267917 A1 Aug. 24, 2023

(30) Foreign Application Priority Data

Feb. 18, 2022 (IN) .............................. 202211008586

(51) Int. Cl.
*G10L 25/00* (2013.01)
*G06F 3/0482* (2013.01)
(Continued)

(52) U.S. Cl.
CPC .......... *G10L 15/063* (2013.01); *G06F 3/0482* (2013.01); *G06F 40/166* (2020.01); *G10L 15/26* (2013.01)

(58) Field of Classification Search
None
See application file for complete search history.

(56) References Cited

U.S. PATENT DOCUMENTS 5,333,275 A 7/1994 Wheatley et al.
6,463,413 B1 10/2002 Applebaum et al.
(Continued)

FOREIGN PATENT DOCUMENTS

CN 111785257 A 10/2020
CN 112954122 A 6/2021
(Continued)

OTHER PUBLICATIONS

Park, Tae Jin, et al.: "A review of speaker diarization: Recent advances with deep learning", arXiv copy of article, Jan. 24, 2021 (Jan. 24, 2021), XP055935769, DOI: 10.1016/j.csl.2021.101317 Retrieved from the Internet: URL:https://arxiv.org/pdf/2101.09624vl.pdf [retrieved on Jun. 27, 2022].
(Continued)

*Primary Examiner* — Satwant K Singh
(74) *Attorney, Agent, or Firm* — Lorenz & Kopf LLP

(57) ABSTRACT

Systems and methods are provided for training of an Automatic Speech Recognition (ASR) model during runtime of a transcription system, the system includes a background processor configured to operate with the transcription system to display a speech-to-text sample of an audio segment of a cockpit communication with an identifier which is converted using an ASR model wherein the background processor receives a response by a user during runtime of the transcription system and display of the speech-to-text sample and causes a change to the identifier to either a positive or negative attribute upon a determination of the correctness of a conversion process of the speech-to-text sample using the ASR model by review of a display of the content of the speech-to-text sample; and to train the ASR model based on information associated with the content of the speech-to-text sample in accordance with the response by the user.

20 Claims, 4 Drawing Sheets

(51) Int. Cl.
  *G06F 40/166* (2020.01)
  *G10L 15/06* (2013.01)
  *G10L 15/26* (2006.01)

(56) References Cited

U.S. PATENT DOCUMENTS

| | | | |
|---|---|---|---|
| 8,249,870 | B2 | 8/2012 | Roy et al. |
| 8,306,675 | B2 | 11/2012 | Prus et al. |
| 8,577,913 | B1 | 11/2013 | Hansson et al. |
| 8,626,498 | B2 | 1/2014 | Lee |
| 9,355,094 | B2 * | 5/2016 | Cuthbert ............... G06F 3/167 |
| 9,368,108 | B2 | 6/2016 | Liu et al. |
| 9,786,283 | B2 | 10/2017 | Baker |
| 10,152,968 | B1 | 12/2018 | Agrusa et al. |
| 10,403,274 | B2 | 9/2019 | Girod et al. |
| 10,573,304 | B2 * | 2/2020 | Gemmeke ............. G10L 15/065 |
| 10,629,186 | B1 | 4/2020 | Slifka |
| 10,878,807 | B2 * | 12/2020 | Tomar ................... G06N 20/10 |
| 12,087,276 | B1 | 9/2024 | Nokob et al. |
| 2005/0165602 | A1 | 7/2005 | Cote et al. |
| 2013/0144414 | A1 | 6/2013 | Kajarekar et al. |
| 2013/0197917 | A1 | 8/2013 | Dong et al. |
| 2015/0217870 | A1 | 8/2015 | McCullough et al. |
| 2016/0379640 | A1 | 12/2016 | Joshi et al. |
| 2018/0047387 | A1 | 2/2018 | Nir |
| 2018/0129635 | A1 | 5/2018 | Saptharishi et al. |
| 2019/0147858 | A1 * | 5/2019 | Letsu-Dake ......... G10L 15/063 |
| | | | 704/275 |
| 2020/0027457 | A1 | 1/2020 | Gelinske et al. |
| 2020/0075044 | A1 * | 3/2020 | Jankowski, Jr. ........ G10L 17/04 |
| 2020/0135204 | A1 | 4/2020 | Robichaud et al. |
| 2020/0171671 | A1 * | 6/2020 | Huang .................. B25J 9/0084 |
| 2021/0020168 | A1 | 1/2021 | Pabla et al. |
| 2021/0074277 | A1 * | 3/2021 | Lewis .................... G10L 15/22 |
| 2021/0225371 | A1 | 7/2021 | Takacs et al. |
| 2021/0233411 | A1 | 7/2021 | Saptharishi et al. |
| 2022/0115019 | A1 * | 4/2022 | Bradley ................. G10L 17/00 |
| 2022/0115020 | A1 * | 4/2022 | Bradley ................ G06F 40/134 |
| 2022/0238118 | A1 * | 7/2022 | Mazzoccoli ........... G06F 3/165 |

FOREIGN PATENT DOCUMENTS

| | | |
|---|---|---|
| EP | 2669889 A2 | 12/2013 |
| EP | 4095853 A1 | 11/2022 |
| WO | 2009104332 A1 | 8/2009 |

OTHER PUBLICATIONS

Nikolaos Flemotomos, et al.: "Linguistically Aided Speaker Diarization Using Speaker Role Information", arxiv.org, Cornell University Library, 201 Olin Library Cornell University Ithaca, NY 14853, Nov. 18, 2019 (Nov. 18, 2019), XP081593342.

Furui Sadaoki; "Recent advances in robust speech recognition" Assistant-based speech recognition from ATM applications. Apr. 17, 1997 pp. 11-20 Section 4.1 XP093050804 Retrieved from the Internet: URL:https//www.isca-speech.org/archive_open_archive_papers/rsr_97/rsr7_011.pdf.

* cited by examiner

SYSTEM AND METHOD FOR IMPROVING AIR TRAFFIC COMMUNICATION (ATC) TRANSCRIPTION ACCURACY BY INPUT OF PILOT RUN-TIME EDITS

CROSS-REFERENCE TO RELATED APPLICATION

This application claims priority to India Provisional Patent Application No. 202211008586, filed Feb. 18, 2022, the entire content of which is incorporated by reference herein.

TECHNICAL FIELD

The subject matter described herein relates generally to vehicle systems, and more particularly, embodiments of the subject matter relate to avionics systems and methods to train a model for Automatic Speech Recognition (ASR) used in transcribing cockpit communications during runtime of a transcription system.

BACKGROUND

Even though datalink technologies are employed in-flight communications, a majority of communications between an Air Traffic Controller (ATC) and a pilot is through speech using cockpit radio channels. Speech recognition applications are used in aircraft systems for transcription of ATC-pilot communications as well as for providing other commands, control, and automatic terminal information service (ATIS) information.

The Automatic Speech Recognition (ASR) model used in the speech-to-text conversion is a probabilistic model operating on a basic sound unit such as a phoneme or character or words that can predict the basic sound unit and stitches words out of predictions that require correction using various language models. Because the ASR model is a probabilistic model and the received input from the VHF/HF channel is noisy, the result is that even the best speech recognition technique (i.e., the most accurate speech-to-text conversion) is not one hundred percent accurate in speech-to-text conversions.

Various techniques (i.e., off-line training, supervised and unsupervised learning) are available and in use to improve the accuracy of the ASR model. However, a common drawback in a majority of the techniques is large or sufficient data amounts required for training of the ASR model that may entail significant amounts of manually transcribed and processed speech via machine learning or deep learning methods to achieve requirements of higher levels or robust domain-specific accuracy levels (especially in the case of ATC-pilot clearance communications). Further, the use of manually transcribing the audio conversations is not generally considered a feasible solution due to its labor intensity and duration requirements.

It is desirable to provide a system and method for enhancing an ASR model for accuracy in transcription by enabling a convenient process of receiving manual input data to update the ASR model without the use of off-line training or sophisticated (i.e., supervised/unsupervised) learning techniques.

It is desirable to provide a background processing system and method that operates when an ASR model is used in a cockpit transcription system that can provide a convenient feedback process for a user to review and provide input by a user selection operation of automatically extracted speech-to-text samples.

It is desirable to provide a system and method that operates during runtime of the transcription system to extract speech-to-text samples using a Natural Language Process (NLP) based application without the interference of an ongoing transcription operation, and for the user to provide a subjective review of extracted clearance messages or other messages for accuracy and to update the ASR model in use.

Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a system to enable training of an Automatic Speech Recognition (ASR) model during runtime of a transcription system is provided. The system includes a background processor which is configured to operate with the transcription system to display a speech-to-text sample of an audio segment of a cockpit communication with an identifier wherein the speech-to-text sample is converted using an optimum ASR model from a set of ASR models; wherein the background processor is configured to receive a response by a user during runtime of the transcription system and display of the speech-to-text sample, and to cause to change the identifier to either a positive attribute or a negative attribute dependent at least upon a determination by the user of a correctness of a conversion process of the speech-to-text sample using the at least one ASR model from reviewing a display of content of the speech-to-text sample; and wherein the background processor is configured to train the at least one ASR model, during runtime of the transcription system, based on information associated with the content of the speech-to-text sample and the audio segment of the cockpit communication in accordance with the response by the user resultant in an update to the at least one ASR model to improve the correctness of the conversion process of cockpit communication.

In at least one exemplary embodiment, the system includes wherein the background processor is configured to display, in a graphical user interface (GUI) during runtime of the transcription system, a list of at least one word associated with the speech-to-text sample with at least one visual attribute of one or more visual attributes for selection by the user of an optional replacement word from the list of at least one word to improve the correctness of the conversion process.

In at least one exemplary embodiment, the system includes wherein the background processor is configured to train the at least one ASR model during runtime of the transcription system based on the information associated with the selection of the optional replacement word by the user.

In at least one exemplary embodiment, the system includes wherein the background processor is configured to implement a text editor in the GUI during runtime of the transcription system to enable the user to edit the speech-to-text sample and to provide the information of the edit to train the at least one ASR model.

In at least one exemplary embodiment, the system includes wherein the background processor is configured to train the at least one ASR model during runtime of the transcription system without interfering in the conversion process of another speech-to-text sample of the cockpit communication.

In at least one exemplary embodiment, the system includes wherein the update to the at least one ASR model is stored in a cloud data storage for distribution throughout a network including at least one set of ASR models implemented by the transcription system for the conversion process of the speech-to-text sample in the cockpit communication.

In at least one exemplary embodiment, the system includes wherein the background processor is configured to maintain the list of at least one word including at least one unique word that is at least added by edit for updating the at least one ASR model and for distributing throughout the network of the one or more sets of ASR models implemented by the transcription system for the conversion process of the speech-to-text sample in the cockpit communication.

In at least one exemplary embodiment, the system includes wherein the background processor is configured to enable the edit of the speech-to-text sample in an off-line process for retrieval to train off-line the network of the one or more sets of ASR models implemented by the transcription system.

In at least one exemplary embodiment, the system includes wherein the background processor is configured to enable, in an absence of receiving the response by the user for the determination of the correctness of the conversion process, a probability-based edit to cause automatically the edit of the speech-to-text sample based on a set of historic edits to the cockpit communication.

In another embodiment, a method of training an Automatic Speech Recognition (ASR) model during runtime is provided. The method includes operating, a background processor with a transcription system to display a speech-to-text sample of an audio segment of a cockpit communication with an identifier wherein the speech-to-text sample is converted using at least one ASR model from a set of ASR models; receiving, by the background processor, a response by a user during runtime of the transcription system and display of the speech-to-text sample for changing the identifier to either a positive attribute or a negative attribute based on viewing of a display of content of the speech-to-text sample and determining by the user, a correctness of a conversion process of the speech-to-text sample using the at least one ASR model; and training, by the background processor, the at least one ASR model, during runtime of the transcription system, based on information associated with the content of the speech-to-text sample and the audio segment of the cockpit communication in accordance with the response by the user for updating the at least one ASR model thereby improving the correctness of the conversion process of the cockpit communication.

In at least one exemplary embodiment, the method includes displaying, by the background processor, in a graphical user interface (GUI) during runtime of the transcription system, a list of at least one word associated with the speech-to-text sample with at least one visual attribute of one or more visual attributes for selecting a replacement word from the list of at least word for improving the correctness of the conversion process.

In at least one exemplary embodiment, the system includes training, by the background processor, the at least one ASR model during runtime of the transcription system based on the information associated with selecting the replacement word.

In at least one exemplary embodiment, the system includes implementing, by the background processor, a text editor in the GUI during runtime of the transcription system for editing of the speech-to-text sample and for proving the information of the editing for the training of at least one ASR model.

In at least one exemplary embodiment, the system includes training, by the background processor, the at least one ASR model during runtime of the transcription system without interfering in the conversion process of another speech-to-text sample of the cockpit communication.

In at least one exemplary embodiment, the system includes storing, by the background processor, an update to at least one ASR model in a cloud data storage for distribution throughout a network including at least one set of ASR models implemented by the transcription system for the conversion process of the speech-to-text sample in the cockpit communication.

In at least one exemplary embodiment, the system includes maintaining, by the background processor, a list of at least one unique word that is added by editing to update the at least one ASR model and for distribution throughout the network of at least one set of ASR models implemented by the transcription system for the conversion process of the speech-to-text sample in the cockpit communication.

In at least one exemplary embodiment, the system includes enabling, by the background processor, editing of the speech-to-text sample in an off-line process for retrieval and training off-line the network of at least one set of ASR models implemented by the transcription system.

In at least one exemplary embodiment, the system includes in an absence of receiving the response by the user for determination of the correctness of conversion process, enabling, by the background processor, a probability-based edit to cause automatically the edit of the speech-to-text sample based on a set of historic edits to the cockpit communication.

In yet another embodiment of at least one non-transient computer-readable medium having instructions stored thereon that are configurable to cause at least one processor to perform a method for training an Automatic Speech Recognition (ASR) model during runtime of a transcription system is provided. The method includes displaying a speech-to-text sample of an audio segment of a cockpit communication with an identifier wherein the speech-to-text sample is converted using at least one ASR model from a set of ASR models; receiving a response by a user during runtime of the transcription system and display of the speech-to-text sample for changing the identifier to either a positive attribute or a negative attribute based on viewing of a display of content of the speech-to-text sample and determining by the user, a correctness of a conversion process of the speech-to-text sample using the at least one ASR model; and training the at least one ASR model, during runtime of the transcription system, based on information associated with the content of the speech-to-text sample and the audio segment of the cockpit communication in accordance with the response by the user for updating the at least one ASR model thereby improving the correctness of the conversion process of the cockpit communication.

In at least one exemplary embodiment, the method includes generating a graphical user interface (GUI) during runtime of the transcription system for displaying a list of words associated with the speech-to-text sample with at least one visual attribute of one or more visual attributes for selecting by the user of a replacement word from the list of words for improving the correctness of the conversion process; and training the at least one ASR model during runtime of the transcription system without interfering in the conversion process of another speech-to-text sample of the cockpit communication.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein.

DETAILED DESCRIPTION

Figure 1:
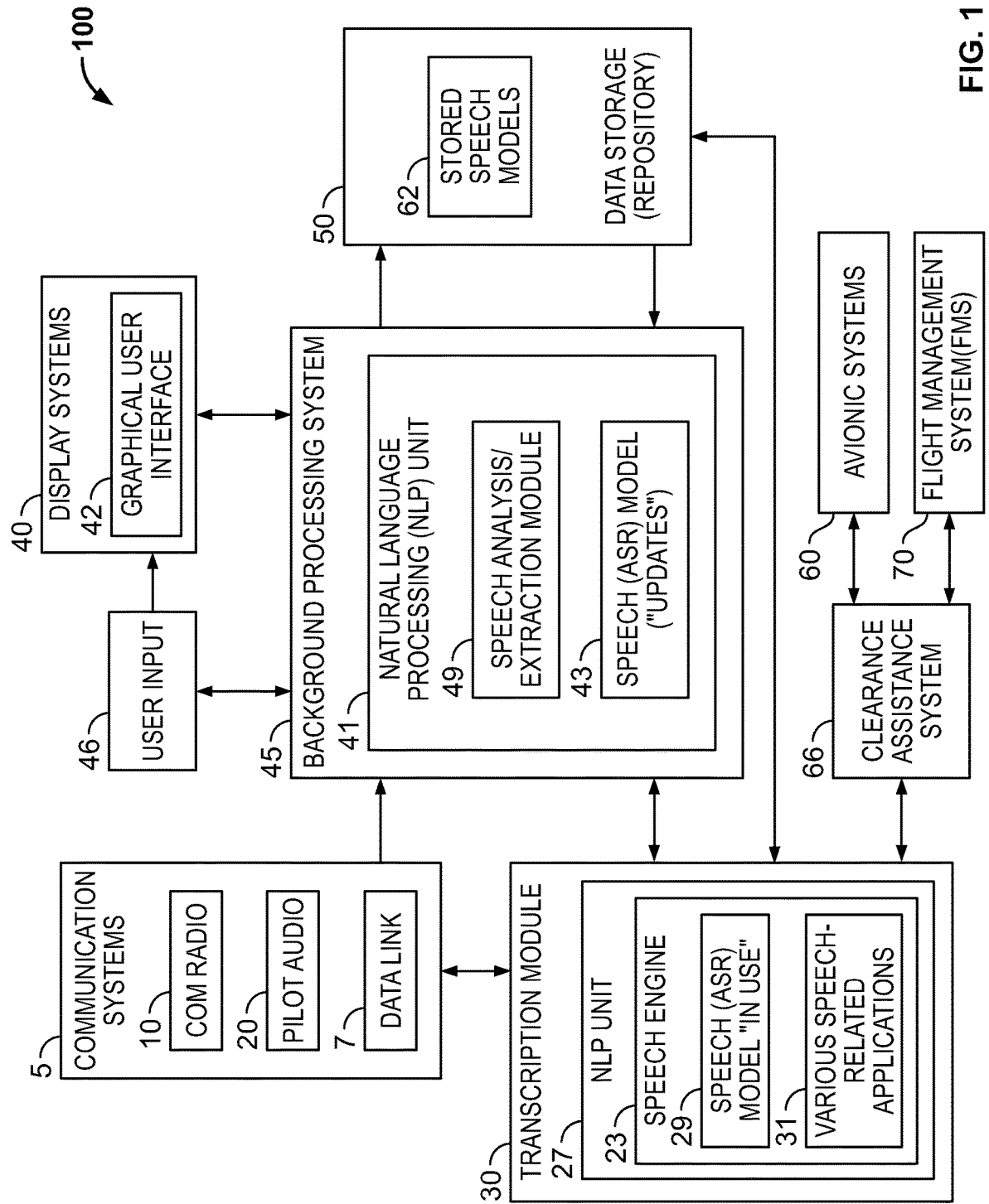
FIG. 1 depicts an exemplary embodiment of a background processing system to train and update the ASR model of a transcription system which may be utilized with a vehicle, such as an aircraft in accordance with an embodiment.

The following detailed description is merely exemplary in nature and is not intended to limit the subject matter of the application and uses thereof. Furthermore, there is no intention to be bound by any theory presented in the preceding background, brief summary, or the following detailed description.

The Air Traffic Controller (ATC) is typically involved with voice communications between a pilot or crewmember onboard the various aircraft within controlled airspace. The ATC and the pilot are often in constant communication over a Voice Channel or the CPDLC through the course of the flight. The ground-to-air communications include clearance, information, or requests for message elements. The ATC to pilot communications have several limitations including but not restricted to miscommunication, transmission errors, misinterpreted voice instructions, ambiguous communications, non-standard phraseology that can cause an increased pilot overload of operational tasks when listening to ATC amidst flying the aircraft.

In various embodiments, the present disclosure provides systems and methods to train a speech recognition model for automatic speech recognition (ASR) for speech-to-text conversion of cockpit voice communications during transcription runtime by providing a background process to receive data by manual input of a user review of the accuracy of extracted speech-to-text samples that are displayed to a user, to receive user feedback to train and update an ASR model without interfering with ongoing transcription processes.

In various exemplary embodiments, the present disclosure describes methods and systems that automatically provide a display of the extracted text of clearance or communication to the pilot or other flight personnel for review to make a subjective determination of the accuracy of the speech to text conversion.

The methods and system include a voice-activated flight deck that enables speech recognition or brings a speech recognition system into the cockpit. The method and system are capable of command and control and transcribing the ATC conversations.

In various exemplary embodiments, the present disclosure describes methods and systems that reduce the pilot's workload by improving ASR by the training of ASR models by user-runtime inputs and by enabling playback and transcription of communications with improved models that are distributed via a cloud-connected network.

In various exemplary embodiments, the present disclosure describes methods and systems that reduce frequency congestion experienced by reducing the need for between the pilot and ATC to make repeated requests for clearance communications based on improvements of ASR models by data from user input. Other benefits to existing and planned cockpit functionality can include enhancement to playback of radio communications and real-time transcription of radio communications which are more contextual and intelligent.

For purposes of explanation, the subject matter is primarily described herein in the context of aircraft operating in controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

FIG. 1 depicts an exemplary embodiment of a background processing system 100 operating during the runtime of a transcription system which may be utilized with a vehicle, such as an aircraft in accordance with an embodiment. FIG. 1 in an exemplary embodiment, the background processing system 100 includes, without limitation, a display system 40, one or more user input devices (user input 46), communication systems 5, a background processing system 45 (i.e., a background processor), a clearance assistance system 66, a flight management system (FMS) 70, one or more avionic systems 60, and a data storage 50 suitably configured to support the operation of multiple sets of speech models (speech model 62), as described in greater detail below.

In FIG. 1, clearance instructions or clearance commands are received from the Air Traffic Control (ATC) via the communications systems 5 of an aircraft and which may be configured to include a data link 7, a COM radio 10, or commands sent from the pilot audio 20. The audio of ATC audio messages (e.g., ATC clearance audio messages), aeronautical operational control (AOC) messages, and pilot voice audio is sent for speech-to-text conversion by the transcription module 30 that implements various ASR models (i.e., speech model 29) for performing the functions associated with speech-to-text conversion. For example, a speech to text converter may be used with the transcription module 30 to receive as input, the radio communications (from communication systems 5) and may store the transcribed text for display and manual editing using the background processing system 45 that operates during the runtime of the speech-to-text conversion process.

In exemplary embodiments, with reference to FIG. 1, the aircraft communication system 5 may receive and send voice communications between the pilot and the controller, other recorded cockpit audio and data via the data link 7. The output from the communication system 5 is received by the transcription module 30 that may be configured with a speech engine 23 that includes various software applications 31 to enhance the accuracy of speech-to-text extraction and conversion by a natural language processing (NLP) unit 27 of voice conversations that occur between the pilot and the controller during the flight. The NLP unit 27 as described is configured to implement a speech engine 23 that uses a speech model 29 to perform functions such as morphological segmentation, entity recognition, conversion of chunks of text into formal representations, tagging parts of speech, parsing, relationship extraction, and sentiment analysis of audio segment parts of the flight conversations between the pilot and controllers. The flight conversations as an example may include clearance messages that are voiced between the pilot and the controller.

The NLP unit 27 may use a number of software applications 31 to perform different types of speech analysis described of the audio voice conversations that are received via the communication system 5.

In an exemplary embodiment, the speech engine 23 of the NLP unit 27 is configured with a set of speech analysis applications that include an application for spotting keywords and sentence segments in voice conversations; an application that categorizes sentences based on priority; an application to categorize sentence segments from the application, and an application to determine a category of the message captured in the voice conversations and an application to determine the flight context on the captured message.

In exemplary embodiments, an output from the transcription module 30 is received by a clearance assistance system 66 that is in communication with various avionic systems 60, and the flight management system (FMS) 70 of the aircraft. For example, the output from the NLP unit 27, after the speech analysis, is sent to the clearance assistance system 66 so that certain context-based priority tagging operations can be performed based, for example, on the priority of the words, and filtering or segmenting of the words and phrases. Once completed, the output is sent to various cockpit display systems 40 and/or configured as an audio output for communication on the aircraft audio systems to the pilot.

In exemplary embodiments, the speech engine 23 may be configured to implement a probabilistic type of speech model 29 based on a sound basic unit such as phoneme or character or words that predicts the basic unit and stitch together a set of words based on a prediction algorithm which can be further enhanced by corrections through various language models. The speech model 29 of a probabilistic type can be domain-specific to aviation morphology to include aviation terminology of alphanumeric and non-generic terms, similar-sounding, and no-vowel English words such as callsign, airport identifiers, navaids, waypoints, fixes, and custom fixes or names.

The transcription module 30 may be connected with the background processing system 45 that may also be connected directly or indirectly to the communication systems 5 of the aircraft. In embodiments, the background processing system 45 may be configured with a separate Natural Language Processing (NLP) unit 41 to perform parallel NLP functions along with the NLP processing steps of the transcription module 30 or to perform additional processing steps that are different from the transcription module 30 NLP processes. In an alternate exemplary embodiment, the background processing system 45 may rely on NLP processing performed by the transcription module 30 and not perform any parallel processing. In either embodiment, the background processing system 45 is configured to operate in a manner to not interfere with the processing performed by the transcription module 30 and not to cause any latency in processing steps functions required by the NLP unit 27 given the robust processer usage and requirements necessary to achieve high-accuracy based speech-text sample conversions.

In exemplary embodiments, the background processing system 45 may receive pilot input via user input 46 to improve the accuracy of speech recognition by sending updates to the speech model 29 (i.e., the probabilistic model in use) by generating new or an updated speech model (an updated ASR model) 43. With increased usage and more application and user input, the probabilistic type speech model 29 can be continually updated or trained by manual user inputs and responses received during runtime without any off-line training or supervised/unsupervised learning methods.

In exemplary embodiments, the background processing system 45 is configured to operate with a graphical user interface (GUI) 42 that enables the display of speech-to-text samples (converted audio segment parts) that allow a user such as a pilot or other flight personnel via the user input 46 to provide appropriate feedback and to indicate a subjective manual determination of a perceived accuracy of a displayed transcribed text segment. The feedback can be received via a single click operation of a selection of either a positive or negative attribute, identifier or emoji, etc. that is automatically displayed on the display system 40 in the graphical user interface (GUI) 42 for selection and is linked or associated with information with each displayed message that can be used to train or update the ASR model in use. In embodiments, other options may be included to indicate a positive or negative attribute. For example, one or more attributes may be used to indicate degrees or ranges of positive or negative feedback by the user. In exemplary embodiments, the conversion process at this stage can be configured to have a default to either an affirmative or positive response or vice versa without an intervention step by the user for convenience of an opposite response (after a period of time) by the user. In this case, only a single response is required by the user. Other embodiments include audible or tactile responses to provide feedback to the system. The background processing system 45 uses data of the positive input, the context of the displayed message, and the corresponding audio for training, updating the speech model at runtime immediately or after a while (i.e., a predetermined time) to improve the speech model accuracy.

The speech models are trained and updated with complete clearance as well as different critical phrases extracted from the clearances using NLP methods. The negative input allows the system to rectify the mistake runtime and display improved clearances. It uses previous message history to infer the correct context by identifying clearance type and populating predicted correct transcription as a list so the pilot can choose the items from the list.

In exemplary embodiments, the background processing system 45 is configured to implement a text editor that allows user corrections and edits to displayed speech-to-text samples. For example, in this case, the background processing system 45 may allow editing operations by edit feature so that a pilot can disregard the populated list and type the corrected sentence (for example a corrected clearance message). The edited text or selected list item is used to correct the message, and this corrected message, with corresponding audio, is used in the background process to adapt or train the speech model in use. The runtime update and generation of new models can be selected by the transcription module 30 for improved accuracy. Also, the update to the speech model can be distributed via a network to update and train other speech models, and this distribution of updates will improve the accuracy of network-wide forthcoming messages.

The background processing system 45 is connected to the data storage 50 that maintains a set of speech models 52 and a list of (most) new unique words added as part of an edit process and stores each speech model 52 and unique words with the route information. The words may also be dynamically added to the language model (of the speech models 52) and the audio of these words can be clipped and used for acoustic model training with updates to the speech model 52 and for further message decoding. The updates and new speech models are saved (i.e., the speech models 52) and distributed via a cloud-connected network for retrieval during offline decoding or performance evaluation.

In embodiments, the background processing system 45 displays the edited text messages in different visual attributes and stores the edits with decoded messages in a log file for retrieval for off-line review and use in off-line speech model training.

The background processing system 45 is configured to operate in the absence of a user (i.e., a pilot input) input and utilize the most probable correct form of transcription using historical data and other speech models available by correlating the textual data with the current message using NLP techniques. The most probable form of text obtained is used along with the audio to train new sets of speech models. In instances, when the speech models are created without user review (i.e., without manual intervention), the background processing system 45 is configured to maintain a separate copy of the model that may also be used for automatic text decoding in the absence of user input.

Figure 2:
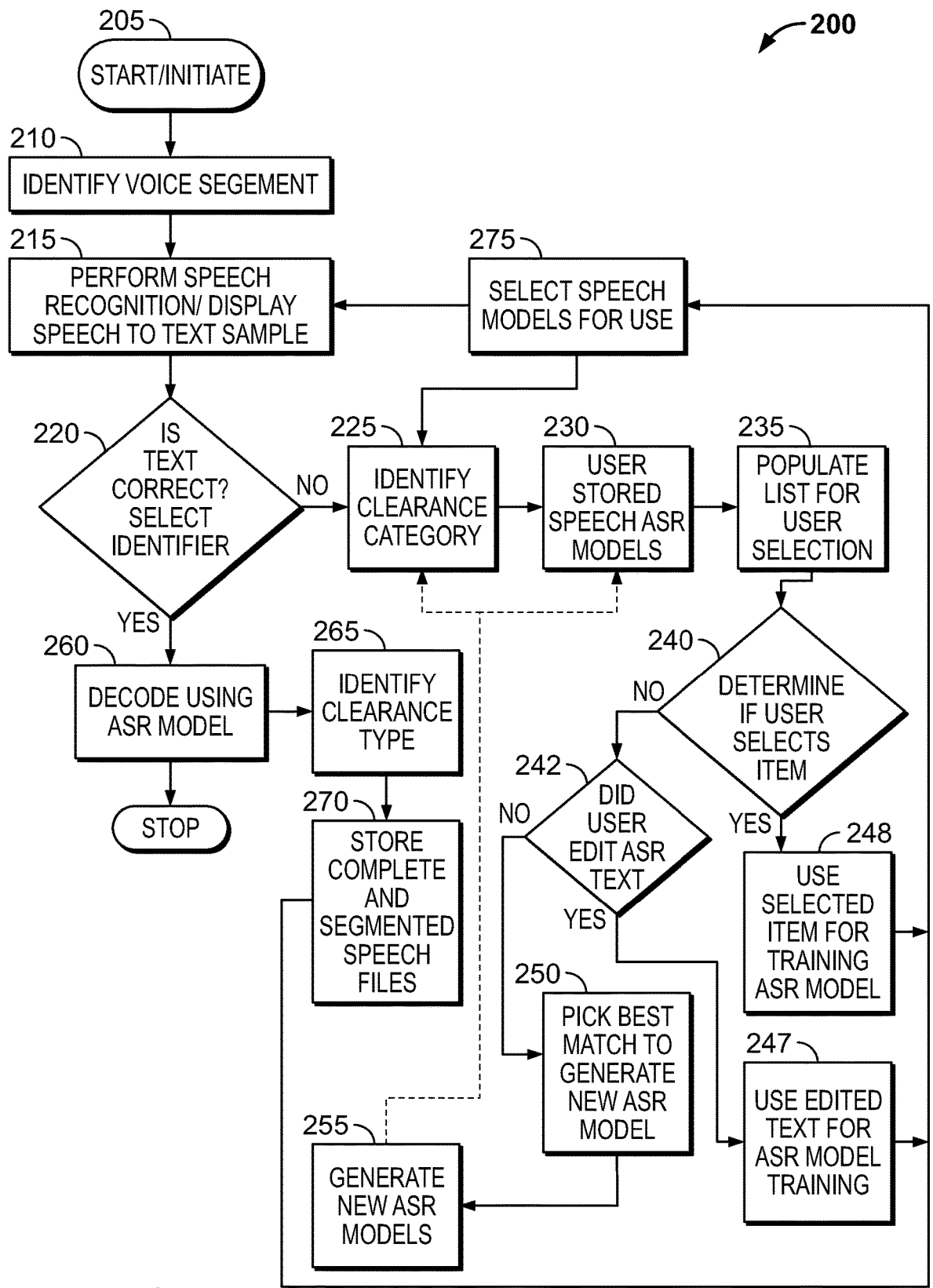
FIG. 2 depicts an exemplary flow diagram and where applicable steps which correspond to parts of the background processing system depicted in FIG. 1 in accordance with an embodiment.

FIG. 2 depicts an exemplary flow diagram 200 and where applicable each step in the process of the exemplary flow diagram 200 is described with elements of the system in FIG. 1 and includes one or more steps which are performed of the background processing system 100 of FIG. 1 in accordance with exemplary embodiments. After the background processing system is initiated at step 205 where the initial operation may be triggered independently or in conjunction with the operation of the transcription module 30 shown in FIG. 1. At step 210, the background processing system 45 identifies a voice clip or part using applications of the speech analysis and extraction module 49 to segment the voice part into audio segments based on sentence and phrase boundaries derived from voiced and non-voiced boundaries via a voice-activated module (not shown). At step 215, the NLP unit 41 of the background processing system 45 performs using various applications, speech recognition, and tasks for displaying speech-to-text samples on the display systems 40 for user review. Alternately, the speech recognition may be performed by the NLP unit 27 of the transcription module 30 which can be integrated with the background processing system 45, and the transcribed (i.e., speech to text conversion) text is displayed on the display systems 40.

At step 220, in response to the display of the text segment, the user is allowed to subjectively review the text based on the user knowledge of the aviation domain terminology and can either select an identifier attached or connected to the text indicates that the displayed transcribed text is correct or incorrect. In other words, by displaying the transcribed text part, the background processing system can rely on the immediate knowledge available to the flight personnel in the cockpit, and the flight personnel's current situational awareness to make a validation of the correctness of the transcription, and to store the feedback of the review during the runtime of the transcription system. The background processing system can capture the immediate knowledge of the flight personnel and tie this knowledge with a review of the voice part rather than having to wait and rely on the recollection of the flight personnel to make a proper determination of the transcription text correctness.

Further, because the text is displayed with a linked identifier to enable a convenient annotation of whether or not the text is correct by the flight personnel, the background processing system provides a process that is not labor-intensive and takes only a momentary action on the part of the user to provide the feedback data that can subsequently be used to formulate or update the probability speech model 29 in use.

In embodiments, the identifier can be configured as an emoji or other icon for the selection of a positive or negative validation of the displayed text. In other exemplary embodiments, the audible or tactile response may also be used in the validation, or a lack of response within predetermined periods may also be indicative of a message in an unverified state and will not be moved to a positive or negative response type state. If there is no user review action received, in embodiments, the system may place indicate the transcription is clear of any issue and likely or is acceptable to the user. Further, in embodiments, the system may be time-based to wait for the user action and may also be configurable to allow the user to make an approval or not after an expiration period.

At step 260, in the case of a positive response, in which the user deems the displayed text to be correct, the process of decoding or transcribing the text can be continued in reliance on the speech model in use (i.e., the ASR probabilistic model that is selected for the particular flight and domain), and the review procedure can be terminated as desired. Alternately, at step 265, further identifications of the transcribed text can also be implemented. For example, at step 265, using the probabilistic speech model via the NLP unit 41 (shown in FIG. 1), the type of clearance may be identified for sending to the clearance assistance system 66. Also, the type of clearance along with the metadata from the transcription process including the probabilistic model implemented may be saved in an appropriate data structure or record with labeling for the clearance type for recall and use in future transcriptions tied to the clearance operation at issue. In an implementation, the type of clearance with the metadata can be used to select the appropriate ASR model as well as for retrieving stored ASR models for use with the processing message text. Also, this information can be used to assist ASR models that require updates and with edited message data. Further, the feedback data, which is collected, and the probabilistic model used can be helpful to identify critical keywords and data values of the clearance based on the text as well as to determine or receive appropriate alignment boundaries from the ASR process, and for splitting audio files for storing voice segments based on critical keywords and associated data values in the ASR process.

At step 270, once the data and probabilistic model are validated and determined, then all the information including is completely stored. This can include the segmented voice files associated with the transcribed text in the data storage 50 (shown in FIG. 1) with new or existing speech models 52 (shown in FIG. 1).

In embodiments, the background process may include using a positive input with the displayed text message, and corresponding audio for speech model training at the runtime of the speech model via the input at step 220 of an updated speech model (i.e., updated speech model 43 shown in FIG. 1). In embodiments, the speech models used are trained and updated with complete clearance messages as well as different critical phrases extracted from the clearance messages using applications of the NLP unit 41.

If the transcribed speech is deemed incorrect (i.e., a negative input), by the user review, then the flow at step 220 proceeds to step 225 to again identify the clearance type using the NLP applications of the NLP unit 41 but correlates the clearance category with text based on categories matched or filtered in the data based on historical data from the data storage 50 (shown in FIG. 1). For example, the background processing system 45 may be configured with an application that enables populating of optional text in the form of a category list. Next, the application may extract current data values and populate the data values as the data list in accordance with current and previous clearance messages.

In embodiments, the negative input data received, allows the background processing system 45 to rectify runtime mistakes and display enhanced or correct clearance messages. For example, if the system uses a previous message history to infer the correct context by identifying clearance type and populates the predicted correct transcription of the transcribed text message as a list so the user can select the appropriate item from the list. In an alternate embodiment, the GUI 42 is configured to enable the user via an edit feature to disregard the populated list and type the correct message text for the clearance message. The edited text or selected list item may then be used to correct the clearance message and this corrected message is associated with the corresponding audio segment part so that the background processing system 45 can further adapt or train the speech model implemented.

In embodiments, the background processing system 45 maintains a list of new unique words that can be added to the speech model (i.e., the updated speech model 43 shown in FIG. 1), and the audio segment part using the new unique words will be stored along with the flight route information for selecting of the speech model by other networked transcription systems in use along the same flight route. The new unique words may also be dynamically added to the speech model and the audio segment part may be used for acoustic training with new or updated speech models used to decode clearance messages in the audio input. The new speech models may also be saved and retrieved in the network for offline decoding and performance evaluation.

At step 230, the NLP unit 41 may select other speech models 52 from the data storage 50 to convert the audio segment to text and may also apply an NLP score to determine the best match for conversion of the current audio segment to text. Once converted, the converted text, clearance message, can be added to a populated data list or category list. The list is sorted based on a set of ASR probabilities associated with each item in the list.

In embodiments, in the absence of user inputs, probabilities based on the NLP score are used to determine along with historical data, and other speech models available correlated to text using applications of the NLP unit 41 to determine the correct form of a converted voice clearance message. The most probable form of text obtained and with the audio segment part are also used to train other speech models.

At step 235, the background processing system 45 may populate one or more lists for a respective user and enable the respective user to select via the GUI 42 an appropriate category list with the clearance type and template augmented with additional text. A linked data list will be configured with values decoded for critical keywords based on one or more new speech models that have been created.

The GUI 42 can be configured with additional editing inputs associated with augmented text from the ASR process that is displayed in the GUI 42 and is based on a respective speech model implemented.

In embodiments, the GUI 42 may be configured with applications of the background processing system 45 to enable edit features such as striking incorrect words, automatically underlining unrecognized words, or adding arrows or other identifiers of missing words. The edit features may also be enabled via audio input on the part of the user, and the background processing system 45 can control the audio from the communication systems 5 to prevent interference when user-based voice editing is being performed.

At step 240, the background processing system 45 determines whether the user has selected any items from a populated list or may wait for a predetermined threshold to be reached. If the user does not select any items from the populated list, then the flow proceeds to step 242 to determine if the user has edited any of the ASR text that is displayed. If the user does not edit any of the ASR text, then the flow proceeds to step 250 and picks the first closest matched clearance type with data values from the list and uses this data of the clearance match type for background speech processing and to generate a new speech model. The newly created speech model is maintained separately at the data storage 50.

If the user has edited the ASR text at step 242, then the flow proceeds to step 247 where the background processing system 45 uses the edited text for background speech processing to generate an updated speech model.

If the user selects items from the populated list at step 240, then the flow proceeds to step 248 and uses the selected list item for background speech training and to generate an updated speech model.

Once the speech models have been updated, the speech models can be stored at 270 and include the completed data and the segmented speech files with associated transcript in the data storage 50. In embodiments, the data storage 50 may be configured with a multi-tenant architecture that allows a database implemented in the data storage 50 to be accessed by multiple transcription systems for using updated speech models in transcription. For example, at step 275, the speech models including the acoustic and language models are implemented in the current speech recognition process for displaying text to the user at step 215.

Figure 3:
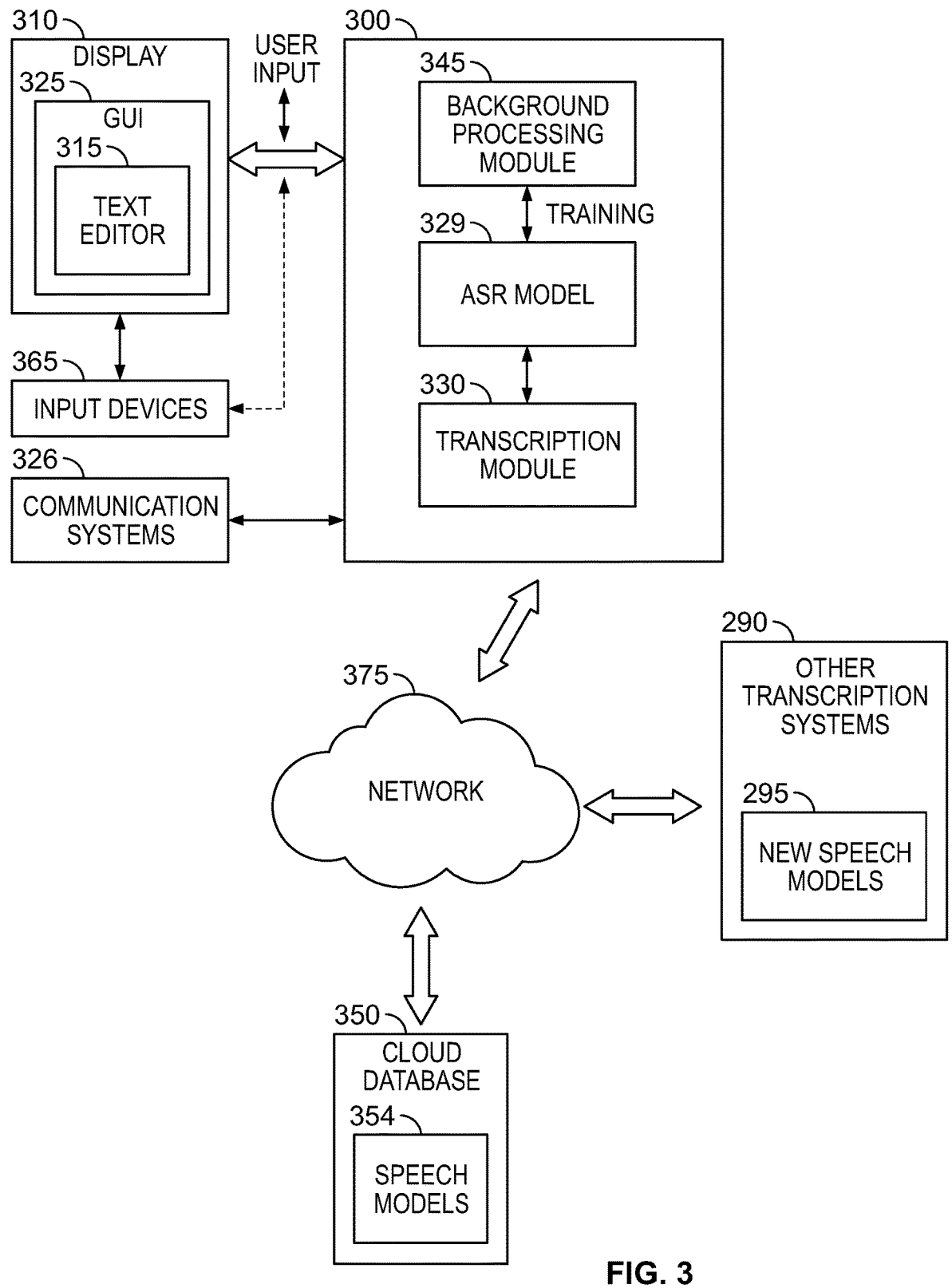
FIG. 3 depicts an exemplary diagram of a network architecture of user input and distribution training a set of ASR models of the background processing system in accordance with an embodiment.

FIG. 3 depicts an exemplary embodiment of a network for training the ASR model of the background processing system in accordance with various embodiments. The illustrated background processing system 300 includes background processing module 345 that communicates with a transcription module 330 for the training of an ASR model 329 during the runtime of a processor of the transcription module 330. The background processing system 300 receives manual user inputs that include validations, corrections, and other inputs in response to a user viewing on a display 310 of a speech-to-text sample for accuracy of the conversion process that is performed by a selected ASR model 329.

In exemplary embodiments, the background processing system 300 generally represents operating of training the ASR model 329 based on user input, and the background processing system 345 may include any sort of hardware, firmware, circuitry, and/or logic components or a combination thereof that is coupled to the input devices 340 for receiving user input, and to the transcription module 330 to receive or otherwise obtain communications that have been decoded by a processor of the transcription module 330. The communications that have been decoded may include extracted samples of speech-to-text segments of voiced clearance messages for display on the display device 310. Depending on the embodiment, the background processing module 345 may be implemented or realized with a general-purpose processor, a microprocessor, a controller, a microcontroller, a state machine, a content addressable memory, an application-specific integrated circuit, a field-programmable gate array, any suitable programmable logic device, etc.

In exemplary embodiments, the background processing module 345 may also include or otherwise access a data storage element or memory (e.g., memory), including any sort of RAM, read-only memory (ROM), flash memory, or any other short- or long-term storage media or other non-transitory computer-readable media, which is capable of storing programming instructions for execution by the background processing module 345. The computer-executable programming instructions, when read and executed by the background processing module 345 cause to perform or otherwise support the tasks, operations, functions, and processes described herein.

The input devices 365 generally represent any sort of keyboard, microphone, audio transducer, audio sensor, or the like capable of receiving touch input, voice, or speech input connected with operative steps of the background processing module 345 to edit via a text editor 315 displayed with a GUI 325 user edits to speech-to-text samples extracted and displayed to train the ASR model 329. The communications system(s) 326 generally represents the avionics systems capable of receiving clearance communications from other sources, such as, for example, other aircraft, and air traffic controllers, or the like. Depending on the embodiment, the communications system(s) 326 could include one or more of a very high frequency (VHF) radio communications system, a controller-pilot data link communications (CPDLC) system, an aeronautical operational control (AOC) communications system, an aircraft communication addressing and reporting system (ACARS), and/or the like.

The background processing module 345 may train, update or otherwise support an ASR model 329 used in a speech recognition system (or voice recognition engine) or another speech-to-text system to assist in the speech-to-text conversions of communications from the communication systems 326 to be transcribed by the transcription module 330. In one or more embodiments, the background processing module 345 may provide updates to the ASR model 329 and may be configured to connect via a network 375 to another transcription system 290 for providing new or updated ASR models 295. Also, the background processing module 345 may be connected to a cloud database 350 that stores records of ASR models 354, and related information includes voice clips for retrieval and use by cloud-connected transcription systems. The background processing module 345 may distribute updates and newly created ASR models 295 via the network 375 to other transcription systems 290 of other operating aircraft in similar routes for improving the accuracy of speech-to-text conversions on these routes.

Figure 4:
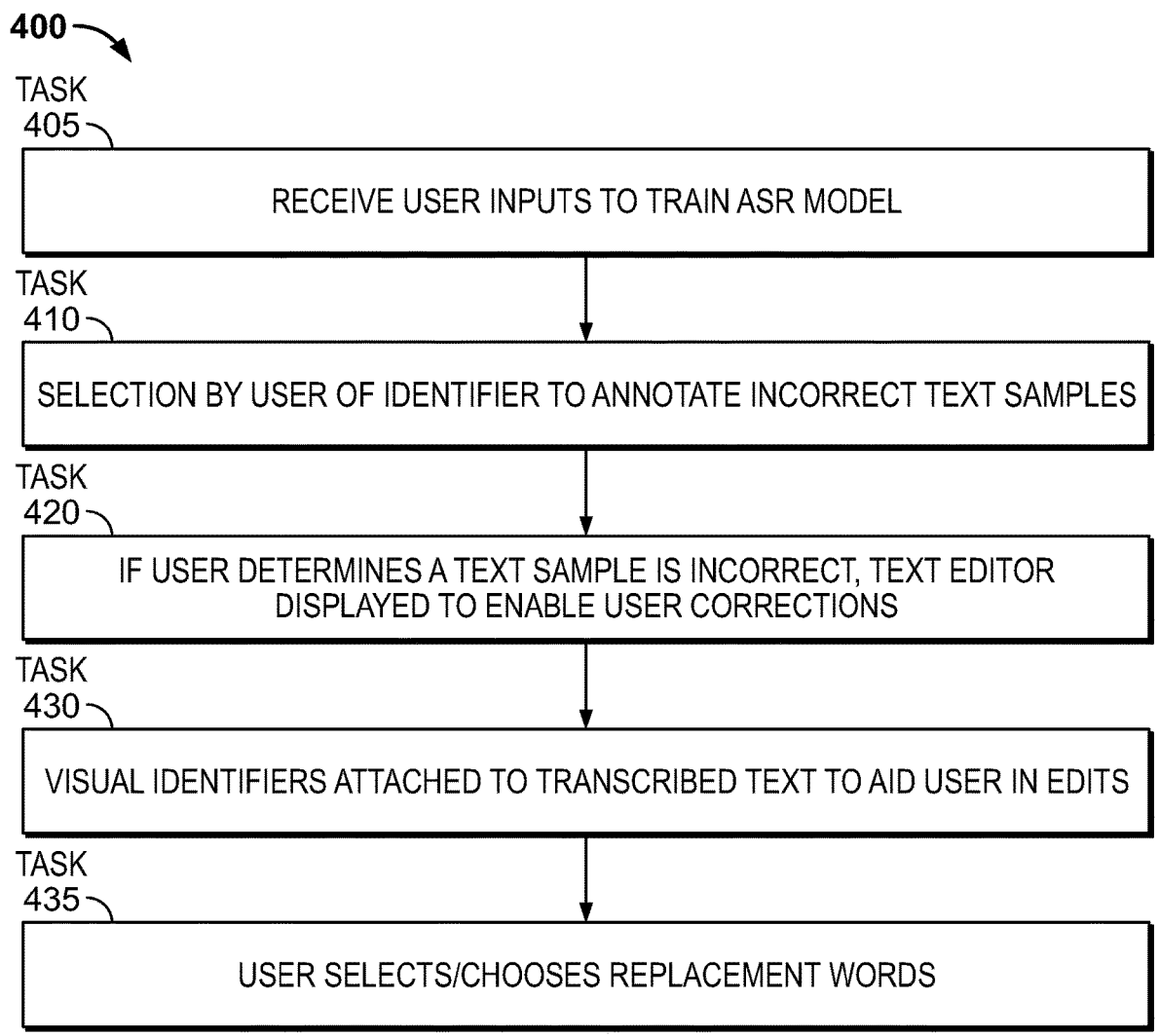
FIG. 4 depicts an exemplary diagram of user input and editing for training the ASR model of the background processing system in accordance with an embodiment.

FIG. 4 is an exemplary flowchart 400 of the user input for improving real-time training of an Automatic Speech Recognition (ASR) model in transcribing of pilot-Air Traffic Control (ATC) communications of the ASR model used in the transcription system by the background processing system in accordance with various embodiments. In FIG. 4, at task 405, the background processing may receive a response of a first input and a second input that is user selectable for attaching to a displayed text message of transcription of pilot-ATC communication and for training the ASR model relied upon for transcribing the pilot-ATC communication into a displayed text message during runtime. In an exemplary embodiment, the first input may include a selectable affirmation icon to attach to the displayed text message indicating the content of the displayed text message is correct upon a user viewing and review of the displayed message. The second input may include a different icon of a selectable negative icon to attach to the displayed message that indicates that the content of the displayed text message is incorrect. At task 410, the background processing module of the transcription module may implement an intelligent algorithm if the user input causes attaching of the negative icon to update the ASR model in use with the data of an incorrect speech-to-text conversion. At task 420, in response to the selection of a negative icon by user input, a text editor which is configured with the graphical user interface (GUI) can be generated by the background processing module to edit and correct the extracted portion of transcribed messages displayed. At task 430, various words in the transcribed message may be visually distinguished by the use of a parsing algorithm for presenting words with different visual attributes for editing convenient to the user. In an embodiment, visually distinguished words in the transcribed message may be linked with a pull-down menu for the user to select replacement words. Information of the user input of the replacement words can be used to improve the ASR model and for distribution to other ASR models in use via the network. maybe generated for the user to correct the displayed message with a convenient pull-down window configured with an options list. For example, the options list would include possible replacement terms that are automatically generated based at least on a corpus of historic flight data associated with a current flight in progress. At task 435, the user may manually select or choose one or more replacement words via a pull-down window, or the user can manually correct a term that is highlighted or not in the GUI using a text editor integrated with the GUI. Information of the edit operation by the user can be conveyed for use in training the ASR model. In an implementation, if the pull-down window containing replacement words does not contain a suitable replacement word or replacement word list is too long, then the user is given the option in the GUI using the text editor to edit the displayed message.

The option of a user selection of a replacement word or editing of a word in the displayed message is configured within a window of time (i.e., a time threshold) for the user to make the edit operation and after making an edit operation the edited displayed message is labeled as a final output (or completed user review of a message) that is stored online or offline for use in online or offline training of ASR models. The time window or time threshold is configured using an app setting mode. The edit operation by the user is performed during runtime of the transcription system and the system is configured to store all the changes such as segmented audio with real-time edits so that offline training may also be enabled. In an implementation, off-line training enables further pruning of the ASR model. Also, upon selection of a replacement word, an attached negative icon to the message can automatically be changed to a positive icon to represent that the message has been corrected. At task 440, the background processing module can maintain a list of unique words that have been added by user manual correction using the text editor and distribute the unique words to other ASR models to prevent redundant or duplicate edits by the user for correction of the unique words. For example, the unique words would be disturbed to an ASR model used in a similar flight route to prevent duplicate actions on the part of the user of having to edit again the unique words in the transcribed message. In the absence of any user inputs, the background processing module can implement a probability-based edit change based on historical edits to the displayed messages and changes made to associated audio by a selected ASR model that is used in the transcription system. In an implementation, the historical-based edits are user-marked positive messages. In implementations, the probability-based edit is marked and highlighted in portions of a displayed message. The message may with the highlighted portion be indicative of a probability-based edit and can be provided for user review with a selection button (or indicator) for the user to indicate by a selection operation (of either a positive or negative indicator) that the message by a probability-based edit operation is approved or not. The editing cycle is terminated upon a positive or approval notification by the user review.

In other implementations, the user may defer marking the response (i.e., a time-based deferment) for a later response which can be realized through various speech, touch, or gesture user operations.

In embodiments of deferment actions, the ASR model changes based on the probability-based edits are saved and used to generate a probable word list and the user is notified of a deferment generated list when later editing the text. Once the defer list messages are edited (e.g., after landing on-ground or in-flight), one or more new speech models are again generated via background processing by the system. If on-ground, then the new (or enhanced) ASR model is implemented in a subsequent flight. If during the flight, then the user is provided with the option to regenerate the edited messages with a new ASR model or use the new ASR model for upcoming messages inflight.

The changes made to the audio can also be stored in a database record of a separate cloud database to maintain a separate copy of automatically trained ASR models.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system to enable training of an Automatic Speech Recognition (ASR) model during runtime of a transcription system, the system comprising:

a background processor configured to operate with the transcription system to display a speech-to-text sample of an audio segment of a cockpit communication with an identifier wherein the speech-to-text sample is converted using at least one ASR model from a set of ASR models;

wherein the background processor is further configured to receive a response by a user during runtime of the transcription system and display of the speech-to-text sample, and to change the identifier to either a positive attribute or a negative attribute dependent at least upon a determination by the user of a correctness of a conversion process of the speech-to-text sample using the at least one ASR model from reviewing a display of content of the speech-to-text sample; and wherein the background processor is further configured to train the at least one ASR model, during runtime of the transcription system, based on information associated with the content of the speech-to-text sample and the audio segment of the cockpit communication in accordance with the response by the user resulting in an update to the at least one ASR model to improve the correctness of the conversion process of cockpit communication.

2. The system of claim 1, wherein the background processor is further configured to display, in a graphical user interface (GUI) during runtime of the transcription system, a list of at least one word associated with the speech-to-text sample with at least one visual attribute of one or more visual attributes for selection by the user of an optional edited word from the list of at least one word to improve the correctness of the conversion process.

3. The system of claim 2, wherein the background processor is further configured to train the at least one ASR model during runtime of the transcription system based on the information associated with the selection of the optional replacement word by the user.

4. The system of claim 3, wherein the background processor is further configured to implement a text editor in the GUI during runtime of the transcription system to enable the user to edit the speech-to-text sample and to provide the information of the edit to train the at least one ASR model.

5. The system of claim 4, wherein the background processor is further configured to train the at least one ASR model during runtime of the transcription system without interfering in the conversion process of another speech-to-text sample of the cockpit communication.

6. The system of claim 5, wherein the update to the at least one ASR model is stored in a cloud data storage for distribution throughout a network comprising at least one set of ASR models implemented by the transcription system for the conversion process of the speech-to-text sample in the cockpit communication.

7. The system of claim 6, wherein the background processor is further configured to maintain the list of at least one word comprising at least one unique word that is at least added by edit for updating the at least one ASR model and for distributing throughout the network of the one or more sets of ASR models implemented by the transcription system for the conversion process of the speech-to-text sample in the cockpit communication.

8. The system of claim 7, wherein the background processor is further configured to enable the edit of the speech-to-text sample in an off-line process for retrieval to train off-line the network of the one or more sets of ASR models implemented by the transcription system.

9. The system of claim 8, wherein the background processor is configured to enable, in an absence of receiving the response by the user for the determination of the correctness of the conversion process, a probability-based edit to cause automatically the edit of the speech-to-text sample based on a set of historic edits to the cockpit communication.

10. The system of claim 1, wherein the at least one ASR model comprises an updated first ASR model trained by the background processor depending on responses by the user, and wherein the transcription system comprises an in use second ASR model to perform conversions from speech to text during a runtime and while the updated ASR model is being trained, and
wherein the transcription system is arranged to update the second ASR model with the updates of the first ASR model.

11. A method of training an Automatic Speech Recognition (ASR) model during runtime, the method comprising:
displaying, via a background processor with a transcription system, a speech-to-text sample of an audio segment of a cockpit communication with an identifier wherein the speech-to-text sample is converted using at least one ASR model from a set of ASR models;
receiving, by the background processor, a response by a user during runtime of the transcription system and display of the speech-to-text sample for changing the identifier to either a positive attribute or a negative attribute based on viewing of a display of content of the speech-to-text sample and determining by the user, a correctness of a conversion process of the speech-to-text sample using the at least one ASR model; and
training, by the background processor, the at least one ASR model, during runtime of the transcription system, based on information associated with the content of the speech-to-text sample and the audio segment of the cockpit communication in accordance with the response by the user for updating the at least one ASR model thereby improving the correctness of the conversion process of the cockpit communication.

12. The method of claim 11, further comprising:
displaying, by the background processer, in a graphical user interface (GUI) during runtime of the transcription system, a list of at least one word associated with the speech-to-text sample with at least one visual attribute of one or more visual attributes for selecting a replacement word from the list of at least word for improving the correctness of the conversion process.

13. The method of claim 12, further comprising:
training, by the background processor, the at least one ASR model during runtime of the transcription system based on the information associated with selecting the replacement word.

14. The method of claim 13, further comprising:
implementing, by the background processor, a text editor in the GUI during runtime of the transcription system for editing of the speech-to-text sample and for proving the information of the editing for training of the at least one ASR model.

15. The method of claim 14, further comprising:
training, by the background processor, the at least one ASR model during runtime of the transcription system without interfering in the conversion process of another speech-to-text sample of the cockpit communication.

16. The method of claim 15, further comprising:
storing, by the background processor, an update to the at least one ASR model in a cloud data storage for distribution throughout a network comprising at least one set of ASR models implemented by the transcription system for the conversion process of the speech-to-text sample in the cockpit communication.

17. The method of claim 12, wherein the at least one ASR model comprises an updated first ASR model, and wherein the method comprising:
training the first ASR model by the background processor and depending on responses by the user;
operating an in use second ASR model of the transcription system during a runtime to perform conversions from speech to text while the first ASR model is being trained so that the conversions are not delayed by the operation of the first ASR model; and
updating the second ASR model with the updates of the first ASR model.

18. At least one non-transitory computer-readable medium having instructions stored thereon that are configurable to cause at least one processor to perform a method for training an Automatic Speech Recognition (ASR) model during runtime of a transcription system, the method comprising:
displaying a speech-to-text sample of an audio segment of a cockpit communication with an identifier wherein the speech-to-text sample is converted using at least one ASR model from a set of ASR models;
receiving a response by a user during runtime of the transcription system and display of the speech-to-text sample for changing the identifier to either a positive attribute or a negative attribute based on viewing of a display of content of the speech-to-text sample and determining by the user, a correctness of a conversion process of the speech-to-text sample using the at least one ASR model; and training the at least one ASR model, during runtime of the transcription system, based on information associated with the content of the speech-to-text sample and the audio segment of the cockpit communication in accordance with the response by the user for updating the at least one ASR model thereby improving the correctness of the conversion process of the cockpit communication.

19. The medium of claim 18, comprising:

generating a graphical user interface (GUI) during runtime of the transcription system for displaying a list of words associated with the speech-to-text sample with at least one visual attribute of one or more visual attributes for selecting by the user of a replacement word from the list of words for improving the correctness of the conversion process; and training the at least one ASR model during runtime of the transcription system without interfering in the conversion process of another speech-to-text sample of the cockpit communication.

20. The medium of claim 18, wherein the at least one ASR model comprises an updated first ASR model trained by the background processor depending on responses by the user, and wherein the transcription system comprises an in use second ASR model to perform conversions from speech to text during a runtime while the updated ASR model is being trained, and wherein the transcription system is arranged to update the second ASR model with the updates of the first ASR model.

* * * * *